June 2, 1931. E. W. MILLER 1,807,665
MACHINE AND TOOL FOR SHAVING GEAR TEETH
Filed July 27 1928 4 Sheets-Sheet 1
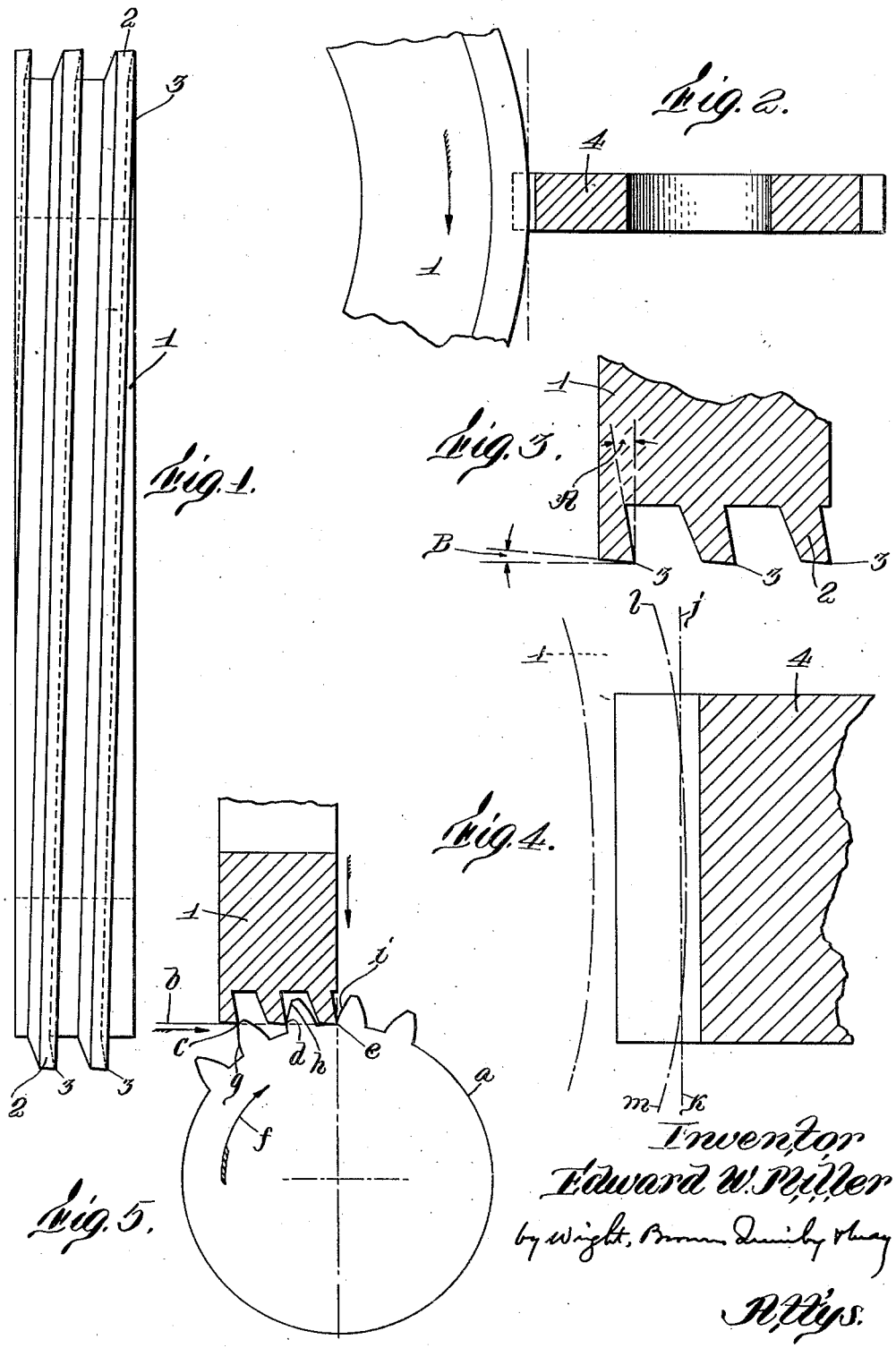

Inventor:
Edward W. Miller,
by Wright, Brown, Quinby & May
Attys.

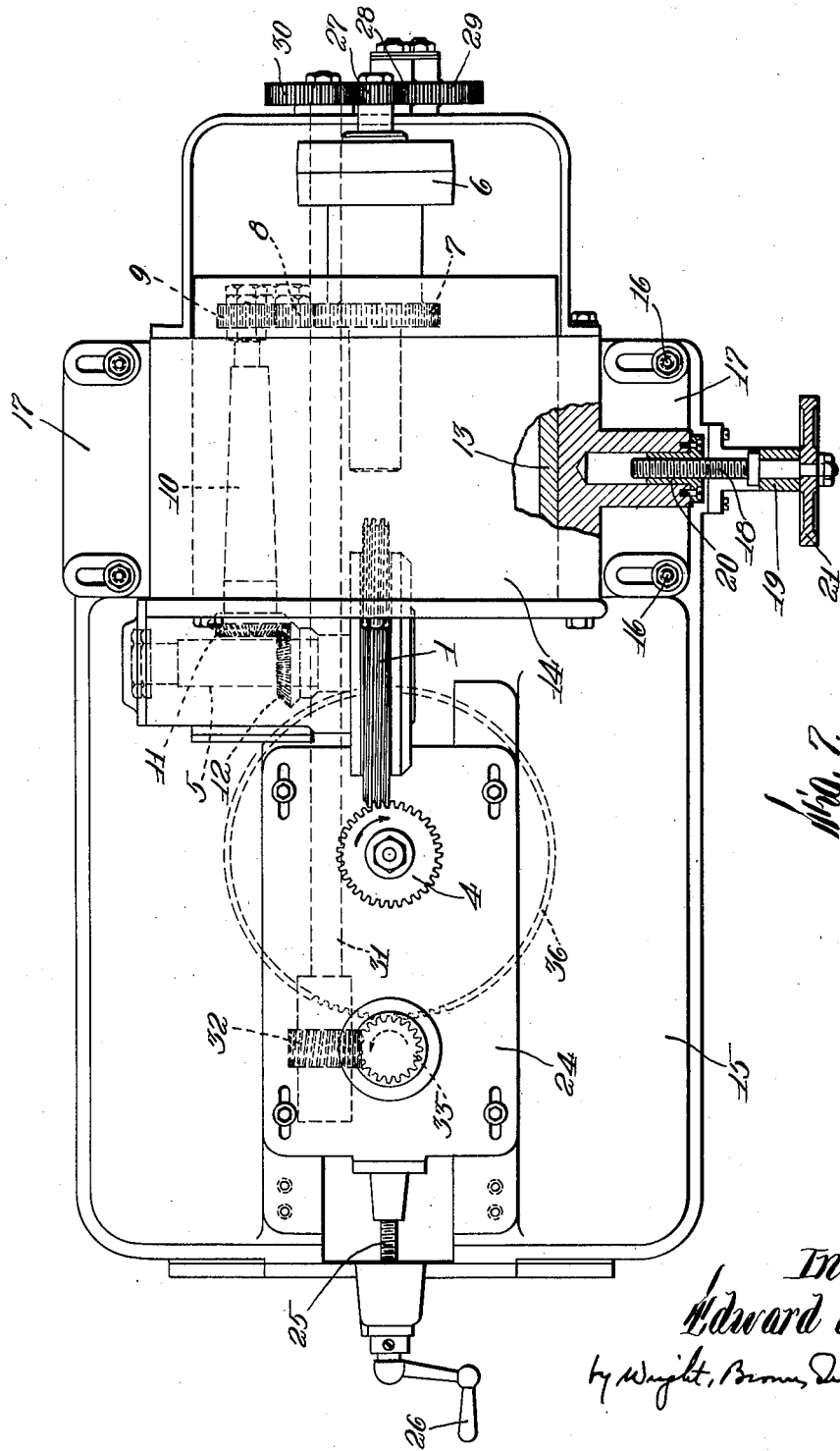

June 2, 1931. E. W. MILLER 1,807,665
MACHINE AND TOOL FOR SHAVING GEAR TEETH
Filed July 27, 1928 4 Sheets-Sheet 4
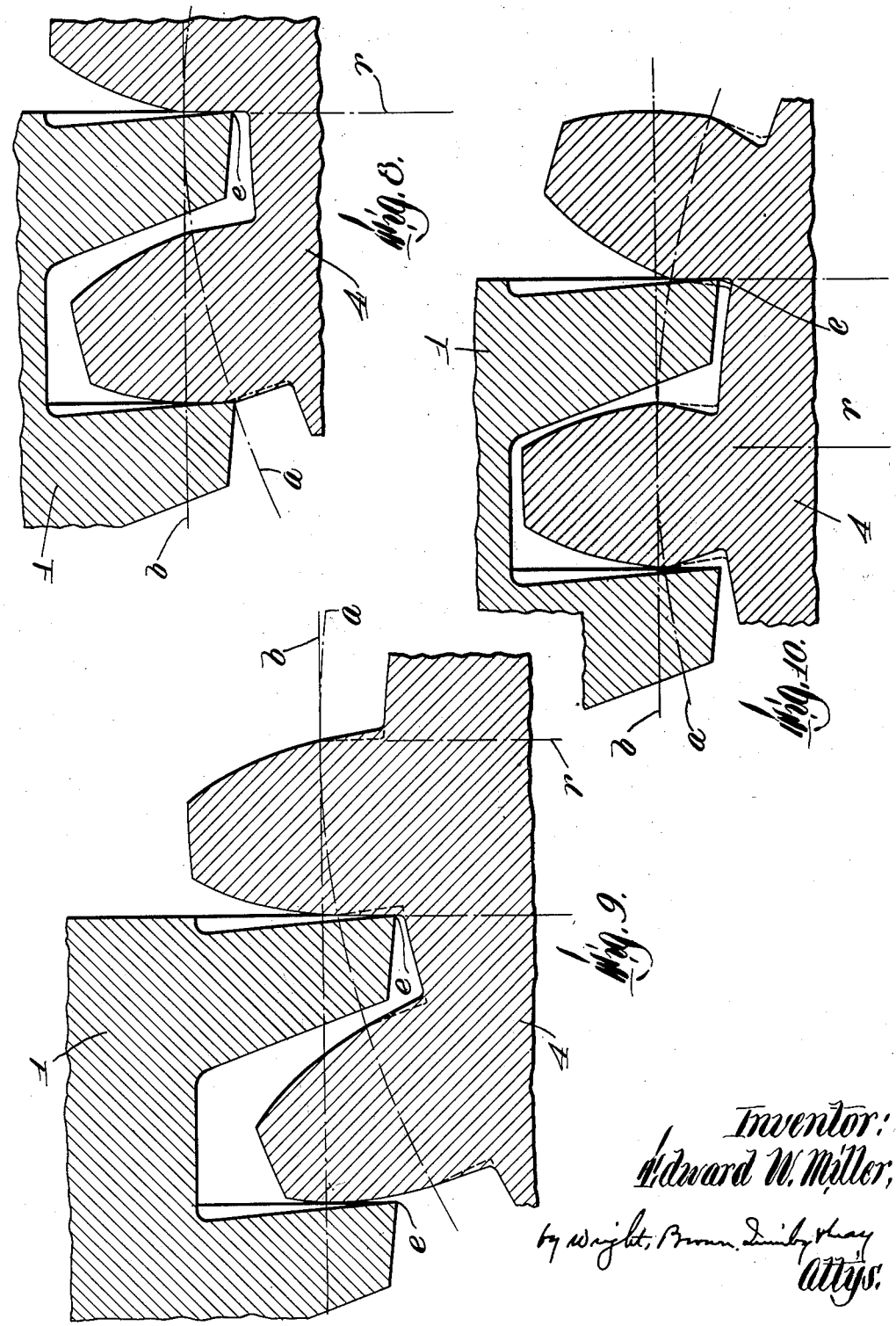
Inventor:
Edward W. Miller,
by Wright, Brown, Quinby & May
attys.

Patented June 2, 1931

1,807,665

UNITED STATES PATENT OFFICE

EDWARD W. MILLER, OF SPRINGFIELD, VERMONT, ASSIGNOR TO THE FELLOWS GEAR SHAPER COMPANY, OF SPRINGFIELD, VERMONT, A CORPORATION OF VERMONT

MACHINE AND TOOL FOR SHAVING GEAR TEETH

Application filed July 27, 1928. Serial No. 295,666.

The present invention relates to machines and appliances for generating the face curves of gear teeth and is more particularly concerned with an edged metal cutter, forming an element of such a machine, by which shavings or parings may be cut from the faces of gear teeth with such control of the cutting action that surfaces of predetermined contour are generated. The object of the invention is to provide a tool of such character, and to operate it in such fashion with respect to an already partially formed or roughed out spur gear, that the teeth of the gear may be brought to finished form and dimensions in a rapid continuous action, without pause or interruption from the beginning to the end of the process. The invention consists in a metal cutting tool having a helical cutting edge, and suitable mechanism for rotating said tool about the axis of its helical edge and simultaneously rotating the work piece in conjunction therewith; together with suitable adjusting means. Its exact nature and the principles which it embodies are more particularly explained in the following specification and pointed out in the appended claims.

In the drawings,—

Fig. 1 is an elevation of a cutting tool embodying the principles of this invention;

Fig. 2 is a fragmentary side or end view of the tool and a sectional view of a work piece in cooperative relation thereto;

Fig. 3 is a fragmentary sectional view on a larger scale of the peripheral part of the cutter, showing the characteristics of its edged cutting element;

Fig. 4 is a fragmentary sectional view of the work piece on an enlarged scale showing the relationship thereto of the edge of the cutter in generating involute gear tooth faces;

Fig. 5 is a diagrammatic plan view illustrating the principle on which the cutter generates involute curves in the faces of tear teeth;

Fig. 7 is a plan view of the machine with a part broken away;

Figs. 8, 9 and 10 are fragmentary views on an enlarged scale illustrating the action of the cutter in forming the flanks of gear teeth within the base circle of their involute face curves.

Like reference characters designate the same parts wherever they occur in all the figures.

Figure 6:
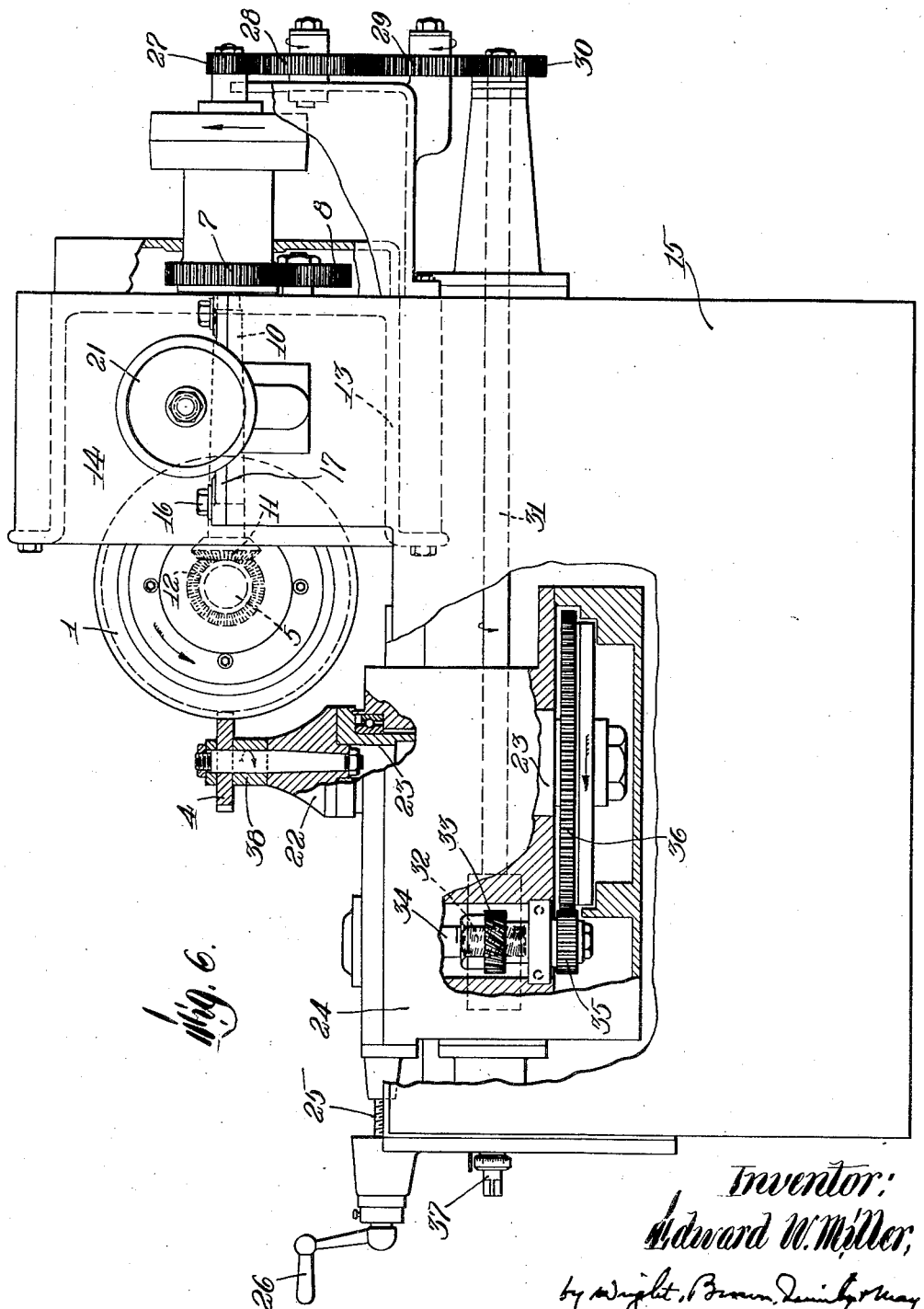
Fig. 6 is a side elevation (with parts broken away and shown in section) of a machine having means for producing and controlling the rotational and feed movements of the cutting tool and work for the purpose indicated.

The principle on which the machine and tool of this invention operates is that of generating involute curves by an action analogous to that of unwinding a cord or tape carrying a scribing point from the circumference of a cylinder about which the cord or tape has been wrapped. When such a cord is unwound from the stationary cylinder, while being kept in a taut condition, any given point in its length will describe an involute curve in space. So also, if the cylinder referred to its permitted to rotate about its axis and the cord is drawn off in a straight line, rotating the cylinder as it unwinds, or, conversely, if the cylinder is rotated so as to wind up the taut cord, a scribing point carried by the cord would generate an involute curve with respect to a surface beside the cylinder and rotating with it. Thus, referring to Fig. 5, if the circle $a$ be considered as the circumference of such a cylinder and the line $b$ an inextensible stretched cord passing from an external point to the cylinder and wrapped about it, and the points $c$, $d$ and $e$ be considered as scribing points carried by the cord, then rotation of the cylinder in the direction of the arrow $f$ thus generates the involute curves $g$, $h$ and $i$. If, further, in place of the imaginary cylinder, cord and scribing points above suggested, a spur gear and a succession of cutting points are substituted, and the points are moved along the line $b$ at the same speed and in the same direction as the adjacent side of the circle $a$, such cutting points will generate curves in the sides of the teeth which are involutes of the base circle $a$. The tool and machine of this invention embody this principle; the tool having a succession of cutting points arranged as a continuous helical cutting edge and being rotated in unison with the work piece at such a rate that the points in its edge, successively and momentarily in a line of action corresponding to the line $b$ of the hypothetical cord, advance continuously along such line at the same rate as the linear travel of the base circle $a$. The helical edge in each rotation of the tool engages the next following tooth of the work, and thus the continued unintermittent rotation of the tool and work causes all of the teeth of the work piece to be cut successively.

The cutter is a disk or annulus of any of the alloys of steel, or any other metal or alloy, suitable for metal cutting tools, and of sufficient axial length or width, having a helical rib. The tool as a whole is designated by the numeral 1, and the rib by the numeral 2. The latter has a continuous cutting edge 3 formed by the intersection of its side and peripheral faces. The side face is undercut back from a radial helicoidal surface on a sufficient angle (indicated as A in Fig. 3) to give cutting clearance, and the peripheral face is tapered on an angle B to provide a top rake of the character needed for the best action of metal cutting tools. The normal pitch of the helix is equal to the circular pitch of the gear teeth to be finished on the base circle of the gear; and the helix makes a number of complete turns sufficient to embrace, between the first and last turns, so much of the line of action as is included within the traverse of any tooth of the gear while passing from the beginning to the ending point of the cutting action. That is, the helix of the cutter should extend at least from the point where the extremity of the gear tooth in its rotation first crosses the line of action, to the point on that line which crosses the inner limit of the involute face curve. In cases where the involute curves extend all the way from the points of the teeth to the base circle, the helical edge of the cutter should extend to the tangent point of the line of action with the base circle, in order to sweep over and generate the entire length of the involute curve. The term "line of action" as here used means the straight line tangent to the base circle of the gear which crosses the successive convolutions of the cutting edge. It is represented by the line $b$ in Fig. 5 and corresponds to the hypothetical cord of the preliminary explanatory discussion.

The work piece 4, a gear which has been previously roughed out, or at least notched deeply and widely enough to admit in its notches the rib 2 of the cutter, is mounted on a work spindle with its median plane in an axial plane of the cutter and its base circle tangent to the line of action. It is rotated simultaneously with the rotation of the cutter in the same direction, as to the side next to the cutter, as the progression of the helical cutting edge along the line of action, and at the same speed. Thus when, in the course of its rotation, the point of any tooth crosses the line of action, it meets the edge of one turn of the helix at a point corresponding to the point $c$ in Fig. 5, and as it continues to rotate, its engagement with the cutting edge proceeds inwardly along the side face of the tooth through the location $d$ of Fig. 5 to the terminal point $e$. In this illustration the involute tooth curves are shown as extending to the base circle, wherefore the terminal point $e$ coincides with the point of tangency between the line of action and the base circle. The successive cutting points of the cutter thus sweep progressively inward from the point toward the root of the gear tooth. They also travel transversely of the tooth profile or draw across the work while thus advancing. This drawing component of the motion of the cutting edge is greater and more rapid than the advancing component. In thus shaving the work with a drawing cut, the cutting tool performs a new function in the gear cutting art with advantageous results. Smooth clean cuts are taken which may be either as heavy as the strength of the cutter, work piece and supporting parts permits, or may be of the most minute lightness; not only permitting a rapid finishing of previously roughed gears, but also enabling their being finished to final dimensions with the utmost accuracy.

Since, in each rotation of the cutter its helical edge engages a following tooth of the work before the cutting action has been completed on the preceding tooth, cutting is continuous throughout the circuit of the gear without intermission for indexing and without even the slightest irregularity in the movement of the gear such as might occur if there were any interruption between the coming into action of the tool on successive teeth.

Since the cutting is performed wholly by the peripheral edge of the cutter, which is a circular arc in axial projection, and the work has appreciable thickness or length in the direction of its own axis, the arc of the cutting edge included between the end faces of the gear necessarily diverges somewhat from the line of action. Actually, taking into consideration the thickness of the gear, the line of action is a plane and will be so called in the immediately following explanation. In Fig. 4, which represents on an enlarged scale a section of the gear or work piece 4 taken on an axial plane of the gear perpendicular to the line of action, the broken line $j$—$k$ represents the intersection of the plane of action with said axial plane, and the broken curved line $l$—$m$ represents the projection on the same axial plane of the cutting edge of the cutter. The cutting points which act on the work at either side of the plane of action generate curves called prolate involutes, which vary from the true involute generated by a point in the plane of action, and in order to average the variation throughout the axial length of the gear teeth generated in accordance with my invention, I recommend so adjusting the cutter and work that the arc of the cutting edge intersects the plane of action and its divergence therefrom is equally distributed on both sides of the plane of action within the axial length of the gear, as represented in Fig. 4. In actual practice, with the use of a cutter of large diameter in proportion to the thickness of the gear, the theoretical error due to this cause is practically inappreciable. For instance, a very large class of the gears requiring to be finished with a high quality of accuracy, those used in automobile transmisisons, are approximately one inch in thickness and have a pitch of about .421". The faces of such gears when generated with a helical cutter of 9" radius show no perceptible variation in curvature from end to end. My invention, however, is not limited as to the dimensions of the cutter and may be embodied in cutters much larger than 9" in radius.

Another theoretical error arises from the helical curvature of the cutting edge; but here also the deviation of the helix in a cutter having the ratio to the work above indicated, from a straight line equal in length to the thickness of the gear is inappreciable.

In operation the cutter is mounted on a spindle 5 (shown in dotted lines in Fig. 7) which is driven from a belt pulley or other suitable driving element 6 through a gear train 7, 8, 9, shaft 10 and bevel gears 11 and 12. The cutter spindle, shaft 10, and gears 8 and 9 are mounted in a holder 13 of cylindrical formation, which is rotatably adjustable in a head 14 so that the cutter may be inclined to conform its helix to the teeth of the gear, whether such teeth are straight or helical. The head 14 is secured to a base 15 by bolts 16 which pass through slots in lugs 17 on the head to permit adjustment of the cutter in the direction of its axis. Means are provided for so adjusting the head consisting of a screw 18 held in a bracket 19 on the base, meshing with a threaded sleeve 20 on the head and having a graduated hand wheel 21 for turning it and indicating the movements thus given to the head.

The work piece 4 is attached by a holder 22 to a work spindle 23 which is mounted in a carriage 24 having provision for adjustment on the base 15 toward and away from the cutter. An adjusting screw 25 operated by a crank 26 is provided for thus adjusting the carriage 24. The spindle is driven rotatably from the pulley 6 by a gear train 27, 28, 29 and 30, shaft 31 to which the gear 30 is secured, a spiral gear 32 splined to shaft 31, a spiral gear 33 in mesh with 32 and mounted on an upright shaft 34, a gear 35 secured to shaft 34, and a gear 36 secured to the work spindle and meshing with gear 35. Angular adjustment of the work spindle to determine the depth of cut and for feeding is effected by a screw 37 which moves the helical gear 32 endwise on the shaft 31. The work piece is placed at such a height that its medial plane, the plane midway between its end faces, coincides with the radius of the cutter which is perpendicular to the axis of the work spindle. It is so located by a changeable sleeve 38 of suitable length placed on the holder 22.

Adjustment of the work carriage by means of the crank 26 brings the plane of action into the desired relation to the circumference of the cutter previously explained. Adjustment of the cutter carrying head by means of the hand wheel 21 shifts the cutter along the line of action in the direction of the line $b$ shown in Fig. 5, as required by the relationship of the teeth to the base circle of the work piece. Thus if the roots of the teeth are outside of the base circle, the cutter is placed so that it terminates short of the diametral plane of the work perpendicular to the line of action; but if the roots of the teeth are within the base circle, then the cutter is adjusted until its terminal coincides with said diametral plane. These two adjustments also serve for placing the work and cutter for finishing the flanks of the teeth within the base circle, as later described.

Screw 37 serves for giving a fine and accurate depth feed adjustment after the work has been placed on the spindle in approximately correct position for a cut of desired depth. It also serves for feeding the work after cutting has commenced, so as to take a succession of cuts after the work has made one or more complete rotations, including a final finishing cut of minute amount, if necessary, in order to bring the gear teeth to exact finished dimensions.

After the involute faces of the teeth have been finished, the flanks within the base circle, if the gear is one which has such flanks, may be finished by further adjusting the work toward the cutter, and by also adjusting the cutter axially as required to produce radial or wide or undercut flanks. If the flanks are radial, the work and cutter are set to cause the rib of the cutter to overlap the line of action $b$ and base circle $a$, and to place the terminal point $e$ of its cutting edge on the radius $r$ of the gear which is perpendicular to the line of action, as shown in Fig. 8. If the teeth are to have wide flanks, the cutter is set with its terminal at a suitable distance in advance of the radius $r$, as shown in Fig. 9; while if the flanks are to be undercut, the terminal of the cutter is placed beyond the radius $r$, considered in the direction in which rotation of the work takes place. In any case, the overlap of the cutter beyond the line of action is made approximately equal to the depth of the tooth flanks, with enough clearance to avoid striking the root circumference of the gear.

The machine herein shown as means for operating the cutter in conjunction with the work piece is the same as that more fully described and claimed in a copending application filed by me, to which reference is directed for details not repeated herein. In this application I claim the characteristics of said machine only so far as they represent essential means for actuating the cutter and work cooperatively. The distinctive new step put forward by this application is the edged cutter having a continuous helical edge which cuts with a drawing action, at the same time that it is advanced relatively to the work, from the outer extremity toward the base circle of the work piece, so as to shave the faces of the teeth. The cutting action thus carried out is not only accurate in its generation of the tooth curve, but it is also rapid and smooth, causing the teeth to be rapidly finished and giving a smooth and polished finish to the tooth faces. Of course this tool finishes the gear teeth on one side only. For finishing the other side, the work piece may be reversed on the spindle in the same machine, or may be taken to a similar machine operating with the reverse action.

What I claim and desire to secure by Letters Patent is:

1. A metallic edged cutting tool adapted to generate the face curves of gear teeth, having a helical rib with a continuous cutting edge formed by the intersection of its peripheral surface with one of its side faces, the convolutions of said rib being formed to admit the teeth of a gear between them with engagement of one side of such a tooth with such edge only.

2. A metallic edged cutting tool adapted to generate the face curves of gear teeth, having a helical rib with a continuous cutting edge formed by the intersection of its peripheral surface with one of its side faces, the convolutions of said rib being formed to admit the teeth of a gear between them with engagement of one side of such a tooth with such edge only, and the said convolutions being spaced apart equally to the prescribed pitch of the gear to be cut.

3. A metallic edged gear generating tool having a helical rib formed with a continuous cutting edge at the intersection between its peripheral surface and one of its side faces, said rib and its convolutions being formed and spaced to admit the teeth of a gear between them and to engage such teeth at said edge only.

4. An edged gear generating cutter having a helical rib with a continuous cutting edge formed by the intersection between its peripheral surface and one of its side faces, said side face being undercut within the perpendicular radii to the helical edge to provide cutting clearance.

5. An edged gear generating cutter having a helical rib with a continuous cutting edge arranged to engage the work at such edge only, said edge being formed by the intersection between its peripheral surface and one of its side faces, said circumferential surface being beveled inwardly from the cutting edge to provide top rake.

6. An edged gear generating cutter having a helical rib with a continuous cutting edge formed by the intersection between its peripheral surface and one of its side faces, said side face being undercut within the perpendicular radii to the helical edge to provide cutting clearance, and the peripheral surface being beveled to provide top rake.

7. The combination of an edged gear generating cutter having a continuous helical cutting edge arranged to be the only part of the cutter which engages the work, and means for effecting relative travel between the cutter and an unfinished gear such that successive points of the helical edge travel from the outer circumference toward the base circle of the gear along the rear faces of successive teeth thereof while also traveling in the axial direction of the gear.

8. An edged gear generating cutter having a continuous helical cutting edge constituting the only part of the cutter which acts on the work combined with means for giving relative movement to said cutter and an unfinished gear such that successive points in the helical cutting edge travel with a component of movement axially of the gear and another component on an involute curve relatively to the base circle of the gear.

9. A gear shaving cutter having a cutting edge and being constructed to clear the work otherwise, combined with means for effecting relative movement between such cutter and an unfinished gear both axially of the gear and in the direction from the outer circumference toward the base circle of the gear in an involute path.

10. The combination with an edged gear generating cutter having a helical rib provided with a cutting edge between the circumferential face and one side face thereof, and being otherwise constructed to clear the work entirely, of means for rotating said cutter about the axis of its helical edge, means for supporting and rotating an unfinished gear with the medial plane thereof radial to said rib, and means for effecting adjustment between the cutter and gear such as to locate the corresponding points in successive turns of the cutting edge approximately in a line of action tangent to the base circle of the gear.

11. The combination with an edged gear generating cutter having a helical rib provided with a cutting edge between the circumferential face and one side face thereof, and being otherwise constructed to clear the work entirely, of means for rotating said cutter about the axis of its helical edge, means for supporting and rotating an unfinished gear with the medial plane thereof radial to said rib, and means for effecting adjustment between the cutter and gear such as to locate the cutting edge approximately in the plane of action of the gear.

12. The combination with an edged gear finishing cutter having a helical rib with a cutting edge between the circumferential face and side face thereof, and being otherwise constructed to clear the work entirely, of means for rotating said cutter about the axis of said cutting edge, means for supporting and rotating an unfinished gear with its medial plane radial to the cutting edge, and means for effecting relative adjustment between the cutter and gear radially of the cutter.

13. The combination with an edged gear finishing cutter having a helical rib with a cutting edge between the circumferential face and a side face thereof, and being otherwise constructed to clear the work entirely, of means for rotating said cutter about the axis of said cutting edge, means for supporting and rotating an unfinished gear with its medial plane radial to the cutting edge, and means for effecting a relative adjustment between the cutter and gear in the direction of the axis of the cutter.

14. The combination with an edged gear finishing cutter having a helical rib with a cutting edge between the circumferential face and a side face thereof, and being otherwise constructed to clear the work entirely, of means for rotating said cutter about the axis of said cutting edge, means for supporting and rotating an unfinished gear with its medial plane radial to the cutting edge, and means for effecting a relative angular adjustment of the gear for determining the depth of cut.

15. The combination with an edged gear finishing cutter having a helical rib with a cutting edge between the circumferential face and a side face thereof, and being otherwise constructed to clear the work entirely, of means for rotating said cutter about the axis of said cutting edge, means for supporting and rotating an unfinished gear with its medial plane radial to the cutting edge, and means for effecting relative adjustments between the gear and cutter both radially and axially of the cutter.

16. The combination with an edged gear finishing cutter having a helical rib with a cutting edge between the circumferential face and a side face thereof, and being otherwise constructed to clear the work entirely, of means for rotating said cutter about the axis of said cutting edge, means for supporting and rotating an unfinished gear with its medial plane radial to the cutting edge, means for effecting relative adjustments between the gear and cutter both radially and axially of the cutter, and means for further adjusting the gear angularly about its own axis relatively to the cutter.

17. The method of generating and finishing gear teeth which consists in rotating a metal cutting tool, having a continuous helical cutting edge, about the axis of such helix, and simultaneously rotating an unfinished gear about its own axis in such relation to the rotating tool that the cutting edge only of the latter engages and traverses the tooth being cut endwise thereof while at the same time the resultant motions of successive points in such edge and of the parts of the gear engaged with such points describe involute curves.

18. The method of generating and finishing gear teeth which consists in rotating a metal cutting tool, having a continuous helical cutting edge, about the axis of such helix, and simultaneously rotating an unfinished gear about its own axis in a direction and at a speed such that its base circle at the tangent point with the line of action travels in unison with the axial displacement of the cutting edge along the line of action.

19. An edged gear generating cutter having a helical rib provided with a continuous cutting edge at the intersection of its peripheral surface with one of its side faces, all points in such cutting edge being equidistant from the axis of the cutter.

20. The method of generating and finishing involute gear teeth having flanks within the base circle, which consists in first generating the involute faces by rotating a metal cutting tool, having a continuous helical cutting edge, about the axis of such helix, locating an unfinished gear in a position where its base circle is tangent to a straight line of action which intersects all the convolutions of said helical edge, and the diameter of the gear perpendicular to said line of action being at one side of all the convolutions of said edge, rotating the gear about its own axis simultaneously with the rotation of the cutter in a direction and at a speed such that its base circle at the tangent point with the line of action travels in unison with the axial displacement of successive points in the cutting edge along the line of action; and finishing the tooth flanks by relatively shifting the cutter and gear so that the cutting edge extends within the base circle of the gear and terminates short of, at, or beyond, said perpendicular diameter according as the tooth flanks are respectively wide, radial, or undercut, and repeating the simultaneous rotation of cutter and gear in the manner first set forth.

21. The method of finishing the flanks of involute gear teeth within the base circle of the gear by means of a cutter having a helical rib formed with a continuous peripheral cutting edge and an undercut side face so that the edge only is adapted to engage the work; said method consisting in relatively locating the cutter and gear with the line of action tangent to the base circle of the gear intersecting all of the convolutions of said rib between the cutting edge thereof and the axis of the cutter, and also locating them so that all the convolutions of the rib are at one side of that diameter of the gear which is perpendicular to said line of action and the last convolution terminates short of said diameter, and simultaneously rotating the cutter and gear about their respective axes at speeds and directions such that the rib in effect progresses along the line of action from the point most remote from said diameter toward said diameter in unison with the linear movement of the base circle at the side thereof which is tangent to the line of action.

22. The method of finishing the flanks of involute gear teeth within the base circle of the gear by means of a cutter having a helical rib formed with a continuous peripheral cutting edge and an undercut side face so that the edge only is adapted to engage the work; said method consisting in relatively locating the cutter and gear with the line of action tangent to the base circle of the gear intersecting all of the convolutions of said rib between the cutting edge thereof and the axis of the cutter, and also locating them so that all the convolutions of the rib are at one side of that diameter of the gear which is perpendicular to said line of action and the last convolution terminates at said diameter, and simultaneously rotating the cutter and gear about their respective axes at speeds and directions such that the rib in effect progresses along the line of action from the point most remote from said diameter toward said diameter in unison with the linear movement of the base circle at the side thereof which is tangent to the line of action.

In testimony whereof I have affixed my signature.

EDWARD W. MILLER.